US006318680B1

(12) United States Patent
Benedict et al.

(10) Patent No.: US 6,318,680 B1
(45) Date of Patent: Nov. 20, 2001

(54) CABLE TROUGH ARRANGEMENT

(75) Inventors: Deanna S. Benedict; Reed Scott Brown, both of Indianapolis, IN (US); Leonard H. Drexler, Roswell, GA (US); Ronald L. Wild, Carmel, IN (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/559,851

(22) Filed: Apr. 27, 2000

(51) Int. Cl.[7] .................................................. F16L 3/00
(52) U.S. Cl. ............................ 248/49; 248/68.1; 248/58; 248/65; 248/89; 211/26; 211/41; 174/72 A; 174/72 B; 174/68.1
(58) Field of Search ................................ 248/68.1, 49, 58, 248/65, 89; 211/26, 41; 174/72 A, 72 B, 68.1

(56) References Cited

U.S. PATENT DOCUMENTS

| 2,896,009 | * | 7/1959 | Caveney ................................ 174/72 |
| 2,921,607 | * | 1/1960 | Caveney ................................ 138/75 |
| 3,643,133 | * | 2/1972 | Towell ................................. 317/122 |
| 4,109,300 | * | 8/1978 | Reimer ................................. 361/415 |
| 4,579,310 | * | 4/1986 | Wells et al. ........................... 248/544 |
| 5,918,837 | * | 7/1999 | Vicain ................................. 248/49 |
| 5,954,301 | * | 9/1999 | Joseph et al. ......................... 248/68.1 |
| 6,102,214 | * | 8/2000 | Mendoza ................................ 211/26 |
| 6,118,075 | * | 9/2000 | Baker et al. ........................... 174/72 A |
| 6,140,584 | * | 10/2000 | Baldissara ........................... 174/68.3 |
| 6,242,698 | * | 6/2001 | Baker, III et al. ................... 174/72 A |

OTHER PUBLICATIONS

Panduit, The New Standard for Cable Management (Adv't), Cabling Business Magazine (Apr. 1999) at p. 11.
Lucent Technologies, "Systimax" type 110 Jumper Troughs, Internet Adv't (Jan. 19, 2000).
Lucent Technologies, Type 110 Patch Panel System Backboard, Photo of model 188D3 Backboard (undated).

* cited by examiner

Primary Examiner—Anita King
Assistant Examiner—Steven Marsh
(74) Attorney, Agent, or Firm—Law Office of Leo Zucker

(57) ABSTRACT

An arrangement for retaining wires or cables inside a trough having base wall, and first and second side walls extending generally parallel to one another from the base wall. The arrangement includes one or more pairs of trapezoidal retainer plates supported on the side walls so that each pair of plates are in confronting relation to one another above the trough. Each retainer plate has a base portion, and an end portion forming an outside edge which defines an approximately 45-degree angle with respect to parallel side edges of the plate. The outside edges of each pair of confronting plates form a gap through which wires or cables can be inserted into or withdrawn from the trough. The gap forms an acute angle with respect to the side walls of the trough, so that inserted wires or cables will be retained by each pair of confronting retainer plates.

10 Claims, 4 Drawing Sheets

CABLE TROUGH ARRANGEMENT

BACKGROUND OF THE INVENTION

1. Field of the Invention

This invention is directed to an arrangement for retaining individual cables or wires inside a cable trough.

2. Discussion of the Known Art

Troughs are generally known for use in retaining and routing wires or cables over desired paths between racks of electrical or communication equipment. For example, a cable management system offered by Panduit Network Systems Group, includes 83-inch high vertical panels that are fixed along sides of equipment racks housing fiber optic distribution shelves. Retaining fingers are provided at certain intervals over the height of the vertical panels, to retain cables within bounds of the panels. See also U.S. patent application Ser. No. 09/427,900 filed Oct. 27, 1999, entitled "Cable Management Assembly for Equipment Racks", which application is assigned to the assignee of the present application and invention.

A vertical cable retainer made by Chatsworth Products is also known. The retainer is in the form of a trough that confines inserted cables on three sides, and uses swing arms at the front of the trough to retain the cables in the trough. Thus, in order to insert or withdraw cables into or out of the trough, the swing arms must be moved out of a retaining position, and then swung back into position when cable insertion/withdrawal is complete.

A so-called 110 Jumper Trough, available from Lucent Technologies Inc. (product nos. 110A2, 110B1), is intended for routing cables horizontally between wiring blocks. The trough has aligned pairs of resilient retaining fingers extending from opposite side walls over the length of the trough. Confronting ends of each pair of fingers may be spread apart to insert or withdraw cables into and out of the trough.

A cable trough having retainer fingers that are fixed, rather than movable and subject to failure from repeated use, would be very desirable.

SUMMARY OF THE INVENTION

According to the invention, an arrangement for retaining wires or cables inside a trough having a base wall, and first and second side walls that extend generally parallel to one another from the base wall, includes one or more pairs of generally trapezoidal retainer plates supported on the side walls of the trough so that each pair of retainer plates are arranged in confronting relation to one another above the trough. Each retainer plate has a base portion, and an end portion forming an outside edge which defines an approximately 45-degree angle with respect to parallel side edges of the plate. The outside edges of each pair of confronting plates define a gap through which wires or cables can be inserted into and withdrawn from the trough, the gap defining an acute angle with respect to the side walls of the trough. Inserted wires or cables routed along the direction of the trough are thus retained by each pair of confronting retainer plates.

According to another aspect of the invention, a retainer plate is provided for use on a cable trough having a base wall, and first and second side walls that extend from the base wall. The plate has a base portion, and an end portion forming an approximately 45-degree angle with respect to parallel side edges of the plate, wherein the plate is constructed and arranged to mount on a support arm that projects from a side wall of the trough.

For a better understanding of the invention, reference is made to the following description taken in conjunction with the accompanying drawing and the appended claims.

DETAILED DESCRIPTION OF THE INVENTION

Figure 1:
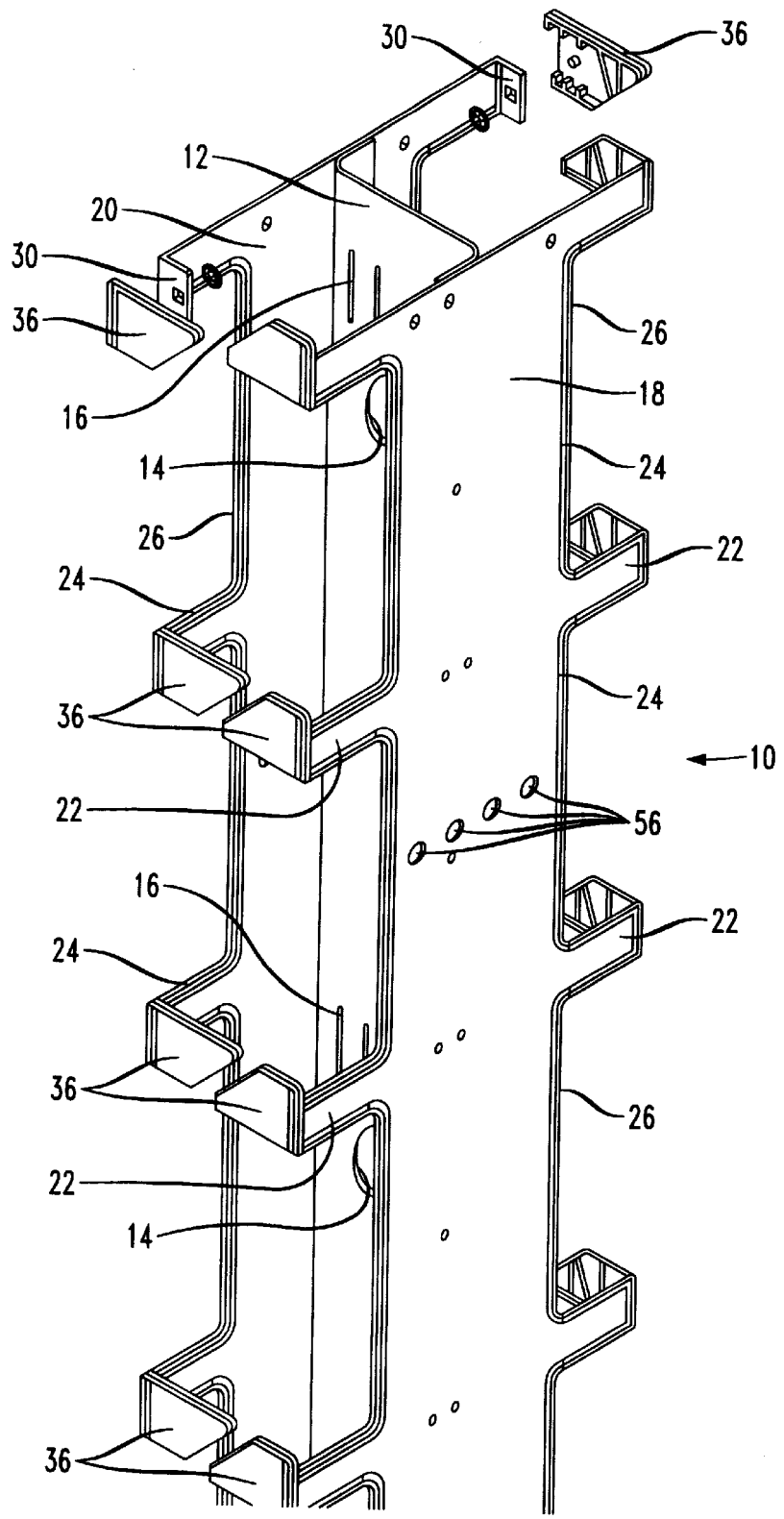
FIG. 1 is a perspective view of a vertical cable trough having a cable retaining arrangement according to the invention.
Figure 2:
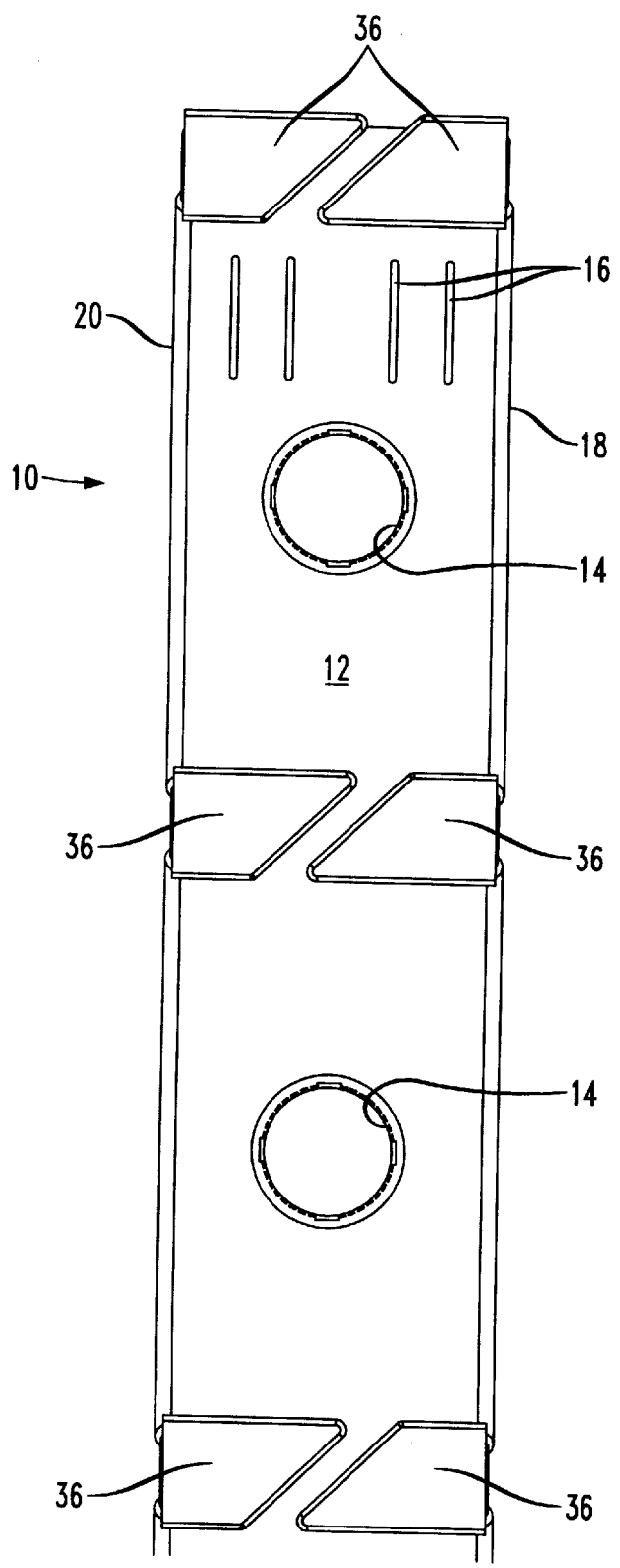
FIG. 2 is an enlarged front view of a section of the trough in FIG. 1.

FIG. 1 is a perspective view of a vertical cable trough 10, having a cable retaining arrangement according to the invention. In the embodiment of FIG. 1, the trough 10 is "double sided", that is, wires or cables (not shown in FIG. 1) may be retained on either side of a common base wall 12 of the trough 10. The base wall 12 may have a number of vertically spaced apart feed through openings 14 to permit wires or cables routed at one side of the base wall 12, to be diverted to the other side of the wall 12 as may be desired. The base wall 12 may also have sets of elongated slots 16 for receiving cable ties or other anchoring hardware.

The trough 10 also has a first side wall 18 and a second side wall 20 that extend generally parallel to one another from both sides of the base wall 12. Wires or cables to be retained in the trough 10 will thus be confined by the base wall 12, and the side walls 18, 20. Pairs of support arms 22 project from the edges of the side walls 18, 20 symmetrically with one another and at spaced intervals over the height of the trough 10. The support arms define a number of generally U-shaped cutouts 24 in the associated side walls 18, 20. Edges of the cutouts 24 may be fitted with a smooth rubber or plastics grommet 26 so that wires/cables that enter or exit the trough 10 over edges of the cutouts 24 will not be torn or damaged by movement against the cutout edges.

Figure 3:
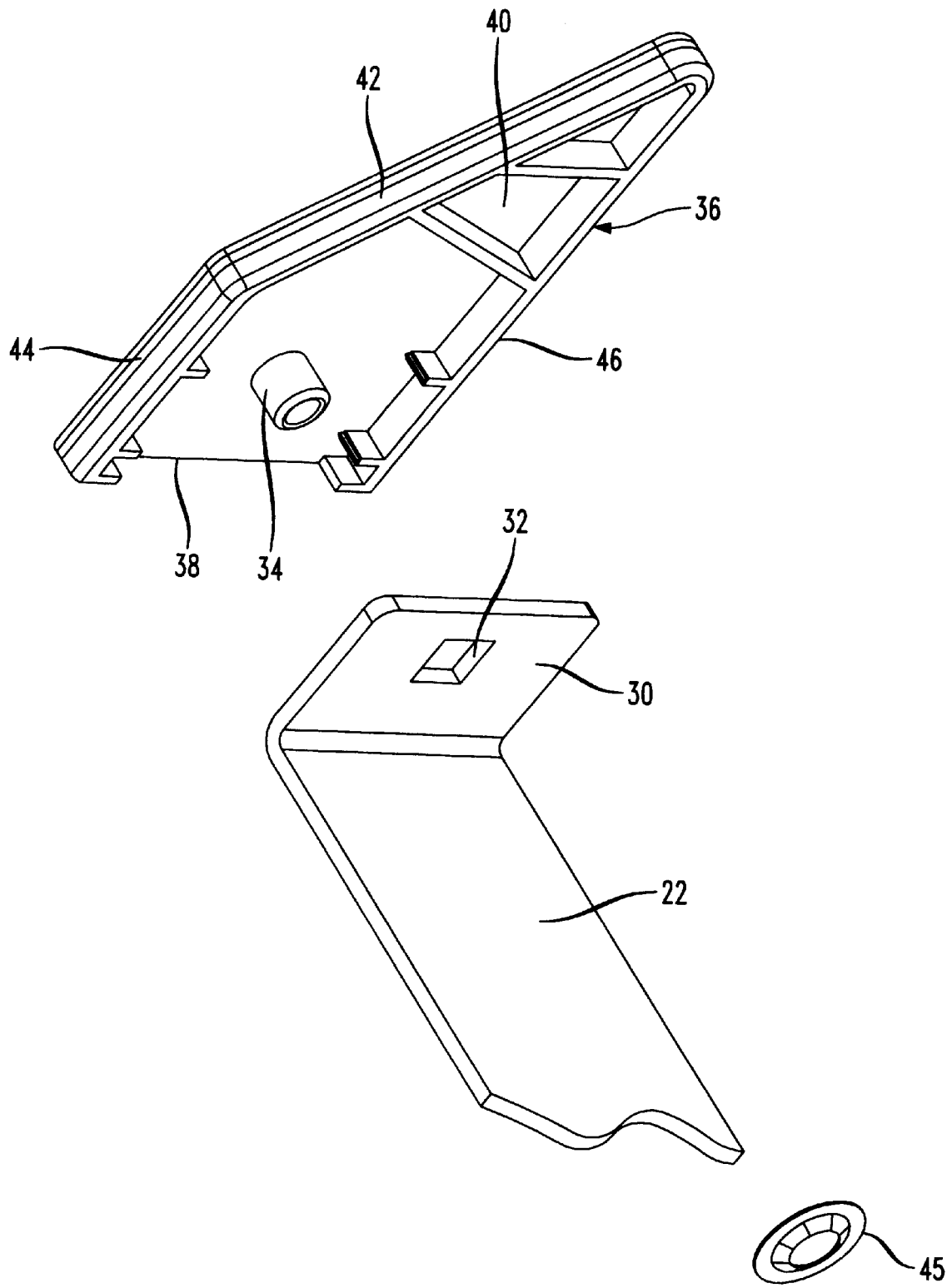
FIG. 3 is an assembly view showing a retainer plate according to the invention, and a support arm that extends from the trough in FIG. 1.

Each of the support arms 22 that project from the side walls 18, 20 has a right-angle bend 30 (see FIG. 3) at the free end of the arm 22. Each right-angle bend 30 has an opening 32 which is configured to receive a mounting boss 34 on the bottom surface of a retainer plate 36. Each retainer plate 36 is made, for example, of a substantially rigid material such as a blend of polycarbonate and ABS, and has a generally trapezoidal shape with a base portion 38 and an end portion 40 as shown in FIG. 3. The end portion 40 of each retainer plate 36 forms an outside edge 42 which defines an approximately 45-degree angle with respect to parallel side edges 44, 46 of the plate. As shown in FIG. 3, the base portion of each retainer plate 36 is mounted on a corresponding support arm 22 by inserting the mounting boss 34 through the opening 32 in the bend 30 of the support arm. A retainer clip 48 is then pressed over the boss from beneath the bend 30, so as to fix the plate 36 firmly atop the support arm 22. More than one mounting boss may be provided on the base portion of each retaining plate, to be received in corresponding openings in the bend 30, depending on the size of the plate.

Figure 4:
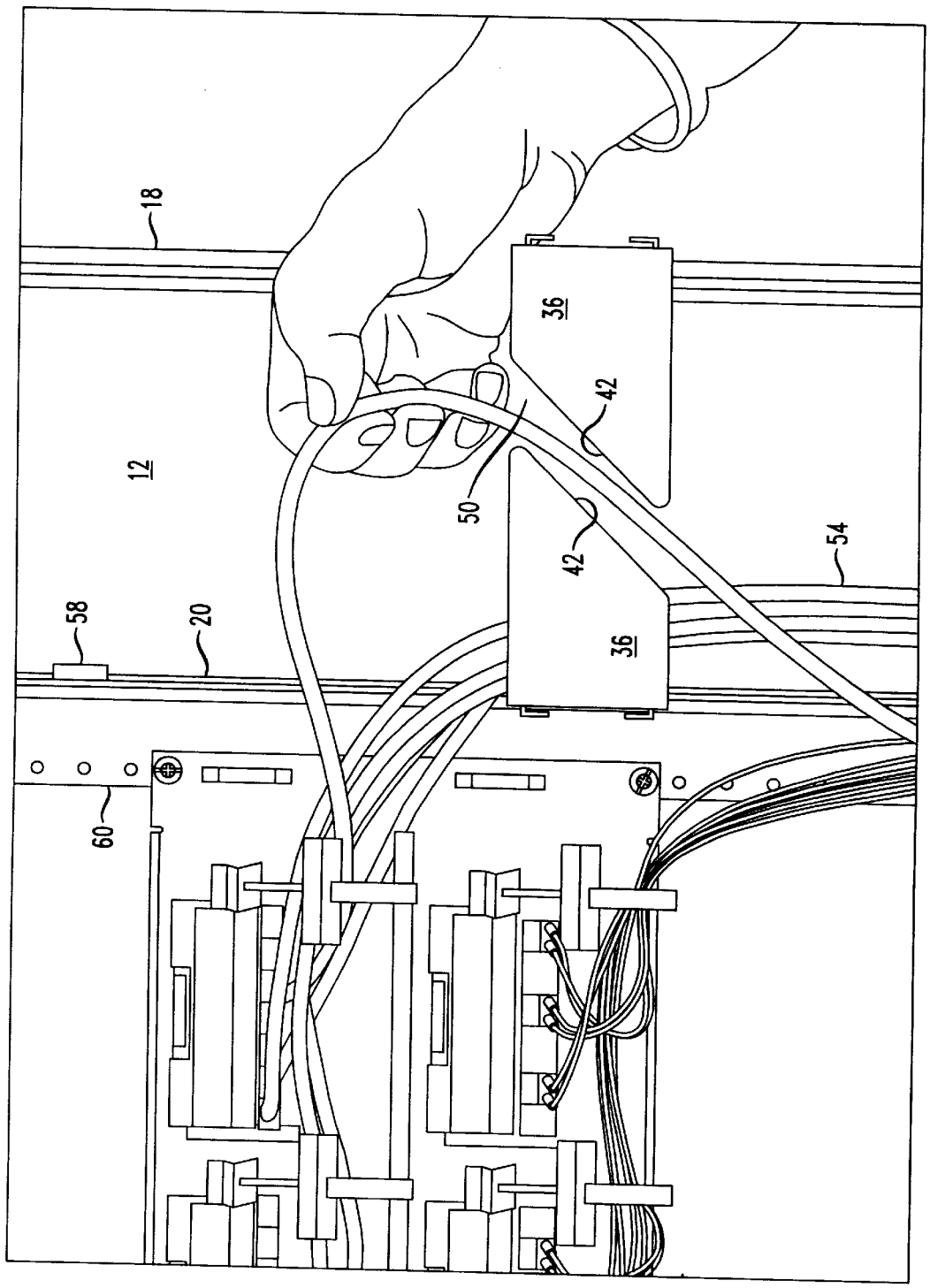
FIG. 4 is a front view illustrating insertion or withdrawal of a cable from the trough in FIG. 1.

As shown in FIG. 4, the outside edges 42 of the retainer plates 36 define an elongated gap 50 through which wires or cables can be inserted into or withdrawn from the through 10. The gap 50 forms an acute angle, e.g., about 45 degrees, with respect to the side walls 18, 20. Also, part of the end portion 40 of one of the confronting plates 36 overlies a corresponding part of the end portion of the other plate in the vertical direction. Thus, inserted cables 54 routed vertically inside the trough will be retained by a part of each pair of the fixed confronting retainer plates 36. As seen in FIGS. 1 and 4, the side walls 18, 20 of the trough 10 have mounting holes 56 to allow the trough to be mounted, e.g., by bolts 58, in a vertical position against a side of an associated equipment rack 60.

As disclosed herein, an arrangement for retaining wires or cables inside a trough includes one or more pairs of symmetrically disposed retainer plates 36 that are supported along the side walls 18, 20 of a cable trough 10. Each retainer plate is of generally trapezoidal shape, and has an outside edge 42 that forms an acute angle, e.g., about 45 degrees, with respect to parallel edges of the plate.

When mounted on the side walls of the trough so that pairs of the retainer plates confront one another at certain intervals over the length of the trough, the plates are dimensioned to form gap 50 for cable installation or removal into and from the trough 10. Because of the shape of each confronting retainer plate, the gap 50 between them also forms an acute angle, e.g., about 45-degrees, with respect to the side walls 18, 20 of the trough 10. And, since part of one plate overlies a corresponding part of the other along the direction of the trough, inserted cables running centrally in the trough will still be retained by parts of the fixed plates.

While the foregoing description represents a preferred embodiment of the invention, it will be obvious to those skilled in the art that various changes and modifications may be made, without departing from the spirit and scope of the invention as pointed out by the following claims. For example, although a double-sided trough 10 is shown in FIG. 1, it will be understood that the present cable retainer arrangement can be applied on a single-sided trough with side walls 18, 20 extending above only one side of the base wall 12.

We claim:

1. An arrangement for retaining wires or cables inside a trough having a base wall, and first and second side walls that extend generally parallel to one another from the base wall, comprising:

one or more pairs of generally trapezoidal retainer plates supported on the side walls of the trough so that each pair of retainer plates are arranged in confronting relation to one another above the trough;

wherein each retainer plate has a base portion, and an end portion forming an outside edge which defines an approximately 45-degree angle with respect to parallel side edges of the plate; and wherein the outside edges of each pair of confronting plates define a gap through which wires or cables can be inserted into and withdrawn from the trough, the gap defining an acute angle with respect to the side walls of the trough, so that inserted wires or cables routed along the direction of the trough are retained by each pair of confronting retainer plates.

2. A retaining arrangement according to claim 1, wherein the retainer plates are constructed and arranged to mount on support arms that project from the side walls of the trough.

3. A retaining arrangement according to claim 1, wherein the retainer plates are formed and dimensioned so that when supported on the side walls of the trough, a part of each retainer plate overlies a corresponding part of a confronting retainer plate along the trough direction.

4. A cable trough arrangement according to claim 1, wherein the retainer plates are made of a substantially rigid material.

5. A cable trough arrangement according to claim 4, wherein the rigid material is a blend of polycarbonate and ABS.

6. A cable trough arrangement according to claim 2, wherein each retainer plate has one or more mounting bosses on a bottom surface for engaging corresponding openings in the support arms.

7. A retainer plate for use on a cable trough having a base wall, and first and second side walls that extend generally parallel to one another from the base wall, the retainer plate having a base portion, and an end portion forming an approximately 45-degree angle with respect to parallel side edges of the plate, and the plate is constructed and arranged to mount on a support arm that projects from a side wall of the trough.

8. A retainer plate according to claim 7, wherein the plate is made of a substantially rigid material.

9. A retainer plate according to claim 8, wherein the rigid material is a blend of polycarbonate and ABS.

10. A retainer plate according to claim 7, wherein the plate has one or more mounting bosses on a bottom surface of the plate for engaging corresponding openings in the support arm.

\* \* \* \* \*